(12) United States Patent
Richter et al.

(10) Patent No.: US 10,389,439 B2
(45) Date of Patent: Aug. 20, 2019

(54) MONITORING AN OPTICAL CONVERTER

(71) Applicant: OSRAM GmbH, München (DE)

(72) Inventors: Jens Richter, Deuerling (DE); Peter Vogt, Kelheim (DE)

(73) Assignee: OSRAM GMBH, München (DE)

( * ) Notice: Subject to any disclaimer, the term of this patent is extended or adjusted under 35 U.S.C. 154(b) by 165 days.

(21) Appl. No.: 15/681,912

(22) Filed: Aug. 21, 2017

(65) Prior Publication Data

US 2018/0054256 A1 Feb. 22, 2018

(30) Foreign Application Priority Data

Aug. 22, 2016 (DE) .......................... 10 2016 115 493

(51) Int. Cl.
*H04B 10/079* (2013.01)
*H04B 10/07* (2013.01)
(Continued)

(52) U.S. Cl.
CPC ..... *H04B 10/07953* (2013.01); *B60Q 11/005* (2013.01); *F21S 41/176* (2018.01);
(Continued)

(58) Field of Classification Search
CPC ............ H04B 10/07953; H04B 10/69; H04B 10/0705; H04B 10/50593; H04B 10/5057;
(Continued)

(56) References Cited

U.S. PATENT DOCUMENTS

| 2012/0235693 A1* | 9/2012 | Feng | G01N 27/20 324/693 |
| 2015/0115302 A1* | 4/2015 | Eder | C09K 11/02 257/98 |

(Continued)

FOREIGN PATENT DOCUMENTS

DE 102005012405 B3 9/2006
DE 102014014852 B3 2/2016
(Continued)

OTHER PUBLICATIONS

EPO; App. No. 17183497.1; EPO Search Report dated Jan. 18, 2018.

*Primary Examiner* — Daniel R Miller
(74) *Attorney, Agent, or Firm* — Fitch, Even, Tabin & Flannery LLP

(57) ABSTRACT

An optical converter is to be simply and reliably monitored. Thereto, a circuit device including a measurement bridge with a measurement branch, a first comparison branch and a second comparison branch is provided. A conductor path loop of the converter can be integrated in the measurement branch. The first comparison branch has a first series resistance variable via a first active element. Similarly, the second comparison branch has a second series resistance variable via a second active element. The first and the second active elements are respectively controllable by the same control signal. The circuit device further has an evaluation circuit with a first comparator and a second comparator, the outputs of which form the control signal and at the same (Continued)

time an output signal of the circuit device in AND-gated manner. Each comparator compares a tap of its respective comparison branch to a tap of the measurement branch.

18 Claims, 4 Drawing Sheets

(51) Int. Cl.
    *H04B 10/50*     (2013.01)
    *H04B 10/67*     (2013.01)
    *H04B 10/69*     (2013.01)
    *B60Q 11/00*     (2006.01)
    *F21S 41/176*     (2018.01)
    *F21S 45/70*     (2018.01)
    *F21V 25/02*     (2006.01)
    *F21V 25/04*     (2006.01)
(52) U.S. Cl.
    CPC .......... *F21S 45/70* (2018.01); *H04B 10/0705* (2013.01); *H04B 10/5057* (2013.01); *H04B 10/50593* (2013.01); *H04B 10/67* (2013.01); *H04B 10/69* (2013.01)

(58) Field of Classification Search
    CPC ........ H04B 10/67; F21S 45/70; F21S 41/176; B60Q 11/005; F21V 25/02
    See application file for complete search history.

(56) References Cited

U.S. PATENT DOCUMENTS

2016/0255318 A1*   9/2016   Chevallaz .......... G02B 26/0833
                                                  348/205
2018/0119897 A1*   5/2018   Vogt ........................ F21V 25/02

FOREIGN PATENT DOCUMENTS

JP         2010118267 A   *   5/2010
WO       2015078482 A1     6/2015

* cited by examiner

MONITORING AN OPTICAL CONVERTER

FIELD

The present invention relates to a circuit device for monitoring an optical converter. Moreover, the present invention relates to a converter assembly with such a circuit device. Finally, the present invention also relates to a lighting device comprising the mentioned converter assembly.

BACKGROUND

The problem underlying the invention results from the necessity of monitoring a conversion element. It takes over the function of converting incident light of a certain wavelength towards another wavelength, but also transmitting the incident light in a scattered manner to a certain extent. Since the incident light originates from a laser in certain cases, the conversion as well as the scattering of it is inevitably required for the harmless employment of the source. In order to be able to ensure this, the sensor system provided thereto can be designed both optically and in the form of an annular metallization. The annular metallization can be disposed on the surface of the converter around a circular conversion area. It is open at a location of the annulus, wherefore its resistance can be monitored as a conductor loop. With a crack of the converter, the annular metallization is usually also disrupted, which is reflected in the corresponding resistance measurement.

The substantial disadvantage of such a simple annular structure is in that it is well within the bounds of possibility that a crack of the converter arises, which does not result in a disconnection of the conductor path. Rather, the crack can for example extend through the already provided opening of the annulus.

The metrological capture of the conductor path loop is sometimes effected by means of current measurement or based on a voltage divider. However, such a simple current measurement is not sufficient to securely detect the blindness of the system by for example the bridging of the open area of the conductor path loop. Alternative known methods for monitoring the converter are in non-contact measurement of the conductor loops via capacitive or inductive methods.

The object of the present invention is therefore in being able to more reliably capture the defect of a converter in a metrological manner.

SUMMARY

According to the invention, this object is solved by a circuit device according to claim 1. Advantageous developments of the invention are apparent from the dependent claims.

Accordingly, corresponding to the present invention, a circuit device for monitoring an optical converter is provided. The monitoring serves for recognizing a defect of the optical converter, which e.g. at least partially converts laser light to other wavelengths. Thereto, the circuit device has a measurement bridge with a measurement branch, a first comparison branch and a second comparison branch. A conductor path loop of the converter can be integrated in the measurement branch. This means that the conductor path loop can for example be closed as a series element in the measurement branch. Thus, it can for example be analyzed based on its resistance.

The first comparison branch has a first series resistance variable via a first active element. This means that the conductor path loop in the measurement branch can be compared to a certain resistance, e.g. with respect to a lower threshold value. This first comparison branch is variable in that its series resistance is varied via the first active element (e.g. a controllable switch). Similarly, the second comparison branch has a second series resistance variable via a second active element. Thus, the conductor path loop in the measurement branch is also comparable to a further value (e.g. upper threshold value) of the second comparison branch. It is in turn variable with respect to its series resistance e.g. by means of an active switch.

The first and the second active elements in the first and second comparison branch, respectively, are respectively controllable by the same control signal. Thus, the control inputs of the two elements can be connected to each other.

Moreover, the circuit device has an evaluation circuit with a first comparator and a second comparator, the outputs of which form the control signal and an output signal of the circuit device at the same time in AND-gated manner. Thus, a comparator circuit with two comparators is provided besides the measurement bridge such that a comparison to two threshold values can be performed. The outputs of the two comparators are logically AND-gated such that the two conditions of the comparators thus have to be satisfied in order that the common output signal of the comparators provides logic "1". This common output signal is now advantageously used for controlling the active elements of the first and second comparison branch and thus fed back to the measurement bridge. At the same time, the common output signal of the comparators represents the output signal of the entire circuit device, corresponding to which the monitored optical converter is classified as defective or not defective.

The first comparator compares a tap of the first comparison branch to a tap of the measurement branch and the second comparator compares a tap of the second comparison branch to a tap of the measurement branch. Thus, the measurement branch or the conductor path loop can be compared to two different reference values (e.g. lower threshold value and upper threshold value), wherein these reference values are kept variable in fed back manner via the output of the comparators in the measurement bridge. Thereby, the transition from the classification as error-free to the classification as defective is for example effected at a higher resistance value of the conductor path loop than vice versa.

The first active element is preferably a metal oxide semiconductor and in particular a PMOS switch. In the same manner, it is advantageous if the second active element in the second comparison branch is also a metal oxide semiconductor and in particular an NMOS switch. These semiconductor circuit types are inexpensive and reliable switches, which ensure high packing density.

In a configuration of the circuit device, the first comparison branch has a different reference resistance for a lower threshold value than the second comparison branch for an upper threshold value. Thereby, two different threshold values can already be preset in advance independently of the variability of the series resistances in the comparison branches.

In an advantageous application of the circuit device according to the invention, a converter assembly with an optical converter, on which a conductor loop is disposed for monitoring it, and a circuit assembly according to the above explanations, which is connected to the conductor loop, is provided. Thus, the conductor loop of the converter can be specifically monitored by the circuit device.

In a particularly advantageous configuration, the conductor loop is formed on a surface of the converter and has the shape of a meander, wherein at least a partial loop of the meander completely surrounds a circular conversion area of the converter. Therein, it is usually also provided that the conductor loop returns again by a similar path after reversal. Such a configuration of the conductor loop guarantees that a crack can usually not extend from the interior to the exterior over the conversion area without at least once severing the conductor loop.

Thus, a lighting device with a laser diode and a converter assembly of the described type can overall be provided, wherein the laser diode is controlled by means of the output signal of the circuit device. Thereby, secure operation of the laser-based lighting device can be achieved.

In a further development, there can be separately connected to supply terminals an anode of the laser diode via a first semiconductor switching element controllable by the output signal and a cathode of the laser diode via a second semiconductor switching element controllable by the output signal. Thus, there is a redundant possibility of switching off for the laser diode. Hereby, the security level is considerably increased.

Furthermore, the first semiconductor switching element can be controlled by the output signal of the circuit device via an inverter. This has the advantage of a lower power consumption.

According to a further advantageous variant of implementation, supply of the remaining lighting device is also ensured via the supply terminals of the laser diode. Since the circuit device has only a low current consumption with respect to the laser diode, separate supply of the circuit device is usually not required. This results in simplification in terms of circuitry and therefore entails assembly and cost advantages.

BRIEF DESCRIPTION OF THE DRAWINGS

Now, the present invention is explained in more detail based on the attached drawings, in which there is shown.

DETAILED DESCRIPTION

The embodiments described in more detail below present preferred embodiments of the present invention. Therein, it is to be noted that the individual features can be realized not only in the described feature combinations, but also alone or in other technically reasonable feature combinations.

Figure 1:
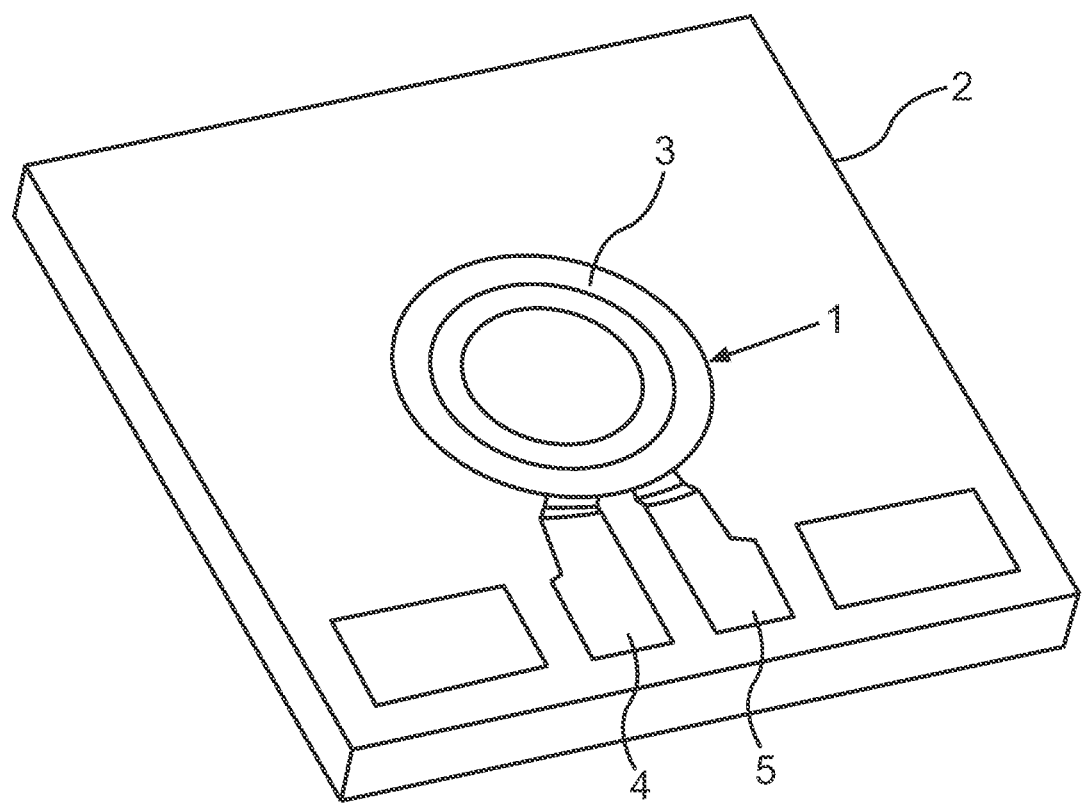
FIG. 1 a converter element with meandering conductor (path) loop.

First, a converter element is to be described based on FIG. 1, which can be used for conversion of laser light. Such a converter element can be used in a lighting device, e.g. in a motor vehicle headlight.

The actual converter 1 is circularly formed and fastened to a substrate pad 2, which is for example formed of sapphire. The surface of the converter 1 is coated with a conductor path loop 3. The conductor path loop has the shape of a meander and its ends terminate in soldering terminals 4 and 5 on the substrate 2. Starting from the soldering terminal 4, the conductor path loop extends in a first circle almost completely along the outer edge of the circular converter. The first circle has a first radius. Further, the conductor path loop extends radially inwards until a third radius is reached, which defines a third circle, along which the conductor loop again extends almost completely in the direction like on the first circle. At the end of this almost complete third circle, the conductor path loop extends radially outwards until a second radius, which defines a second circle, which is located between the first and the third circle. On this second circle, the conductor path loop runs back until the second solder terminal 5 related to the direction on the first circle and therein again describes almost a complete circle. Thereby, the conductor path loop has three concentric partial loops, which are located on the first, the second and the third circle.

A simpler shape of the meander structure is also conceivable, which would have optical disadvantages, but would only be composed of two loops. A shape is crucial in the meander structure, which does not allow a free, radially outwards extending converter surface.

The configuration of the loop offers the advantage that a crack from the edge to the center of the converter cannot arise on the one hand without injuring the conductor path loops. Therein, a completely circumferential crack is excluded, which is technically not plausible. That a crack of the converter affects the metallization (e.g. of aluminum) is ensured via the ratio of the thicknesses of e.g. 650/35 (converter to meander thickness) as well as via the adhesion of the metal layer to the converter.

Moreover, this design of the conductor path loop offers the possibility of increasing the resistance value via maximization of the length with corresponding reduction of the width. This in turn increases the measurement security since the influence of the lead resistances correspondingly decreases.

The approximately completely circular conductor path loop further has the function of an aperture. Such an annular aperture is required in laser converter applications to mask out portions of the laser beam and converted light at the edge, which have a lower intensity. Only in this manner, it can be ensured that the ratio of converted and non-converted light is complied with in the desired manner.

The requirement to the sensor system is in recognizing a resistance alteration above and in particular below a certain threshold value. Therein, exceeding the threshold value covers the described damage of the converter (of the safety-critical case of error). In contrast, falling below considers the case of error, which would cause the sensor system to go blind. Namely, if the soldering terminals 4 and 5 are for example bridged by a metal part, damage of the converter could no longer be detected. For this reason, this is also an error, which has to result in deactivation of the source on the part of the electronics.

A further requirement resulting from the application is the implementation of a hysteresis in the resistance detection. Namely, if the resistance of the conductor path loop to be monitored is close to the threshold value due to different influences, this can result in the fact that the conductor loop is continuously variably recognized as defective or non-defective by varying environmental conditions (like temperature) as well as by variations of the internal parameters (like supply voltage). This would entail that the system alternately proves itself to be as defective and non-defective with respect to its environment depending on the boundary conditions.

Figure 2:
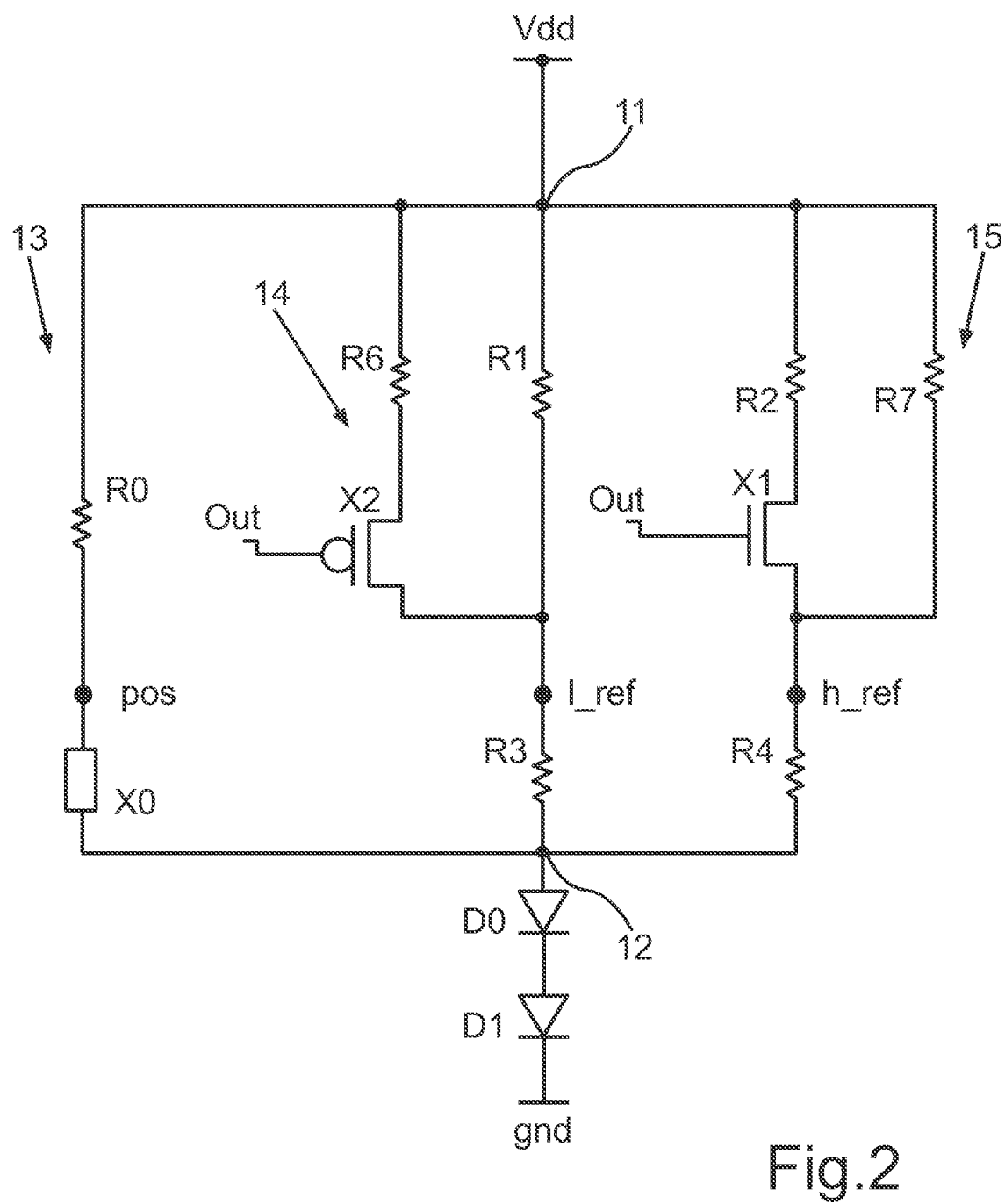
FIG. 2 a bridge circuit for evaluating a resistance alteration of a conductor loop.

Therefore, within the scope of a circuit device for monitoring the optical converter 3, a bridge circuit according to FIG. 2 is employed, which serves for evaluating a resistance alteration of the conductor loop of the converter.

Therein, a component X0 symbolizes the conductor path loop of the converter, which can be regarded as an ohmic resistance. As the comparison resistances, a resistor R4 is provided for an upper threshold value and a resistance R3 is provided for a lower threshold value. In the basic function, the illustrated circuit corresponds to a bridge circuit or measurement bridge.

The bridge is located between a first node 11, which is connected to a supply terminal Vdd, and a second node 12, which is here purely optionally connected to ground gnd via two diodes D0 and D1. A measurement branch 13, a first comparison branch 14 and a second comparison branch 15 are parallel between the first node 11 and the second node 12.

Besides the conductor path loop X0, which is to be connected to the measurement bridge, the measurement branch 13 has a series resistance R0 in series. A measurement potential pos can be tapped between the conductor path loop X0 and the resistor R0.

The first comparison branch 14 has a resistor R3 in series with a resistor R1. A series connection of a resistor R6 with a PMOS switch X2 is parallel to the resistor R1. The input thereof is controlled by a control signal Out. A tap for a potential 1_ref of the lower threshold value is between the resistor R1 and the resistor R3.

The second comparison branch 15 is constructed analogously to the first comparison branch 14. A series connection of a resistor R4 and a resistor R7 is between the first node 11 and the second node 12. A series connection of a resistor R2 with a controllable switch X1, which is preferably formed as an NMOS switch, is parallel to the resistor R7. The same control signal Out as in the controllable switch X2 of the first comparison branch 14 is applied to its control electrode. The potential h ref for the upper threshold value can be tapped at a tap between the resistor R7 and the resistor R4.

Thus, while a fixed series resistance R0 is provided in the measurement branch 13, a series resistance is in the first comparison branch 14, which is constituted of the components R1, R6 and X2. This series resistance is variable via the switch X2. In the same manner, the series resistance in the second comparison branch 15 includes the components R2, R7 and X1. It is also variable via the switch X1. In particular, the two active elements X1 and X2 allow adapting the series resistances in the comparison branches via the control signal Out.

Figure 3:
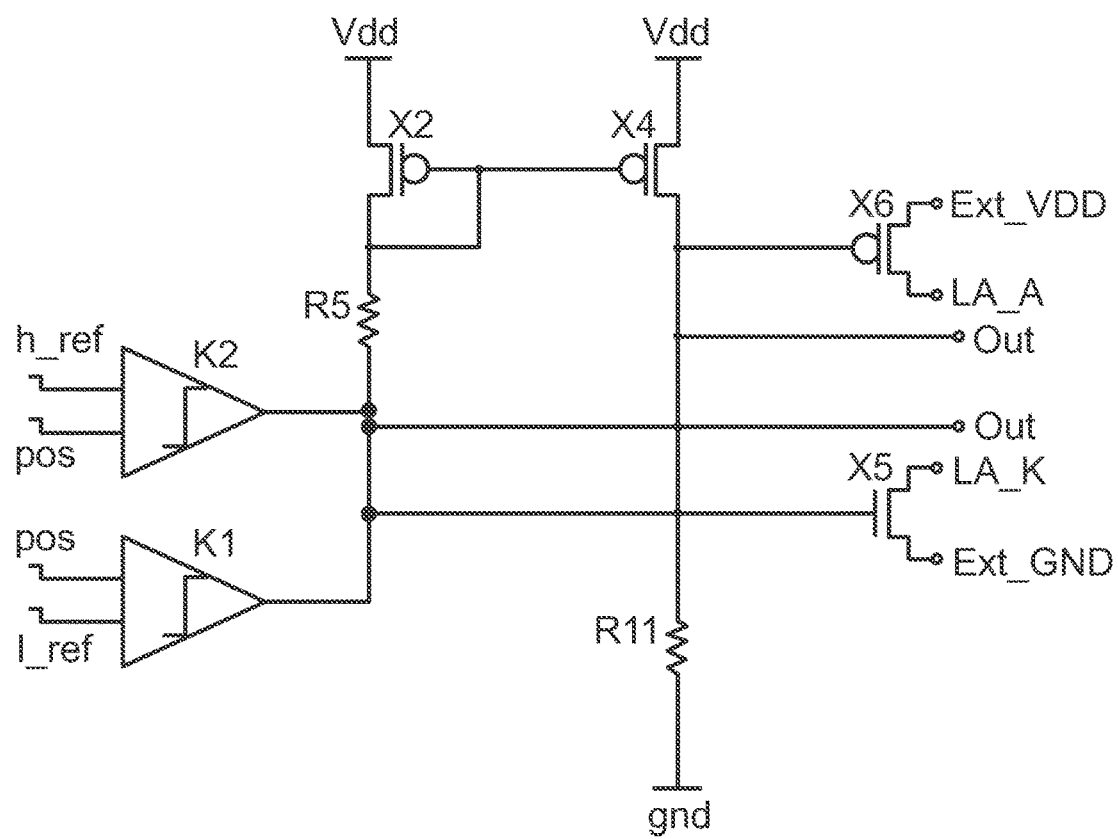
FIG. 3 a comparator circuit for evaluating the output of the bridge circuit.

In FIG. 3, the corresponding evaluation circuit of the circuit device for monitoring the optical converter is illustrated. This evaluation circuit also provides the control signal Out for the active elements X1 and X2 of the bridge circuit of FIG. 2. On the input side, a first comparator K1 and a second comparator K2 are provided. The first comparator K1 compares the measurement potential pos to the potential 1_ref in the first reference branch 14 of the bridge circuit. Similarly, the second comparator K2 compares the comparison potential h ref to the measurement potential pos. The output signals of the two comparators K1 and K2 are logically AND-gated by the respective "open collector" designs. The resulting signal represents the output signal Out of the circuit device.

The output signal Out is also used for switching a laser diode not illustrated in FIG. 3 of a corresponding lighting device. In FIG. 3, only the terminals LA_A and LA_K are illustrated, via which the anode and the cathode of the laser diode can be connected. The terminal LA_A is connected to an external supply potential Ext VDD via the drain-source path of a PMOS switch X6. In contrast, the cathode terminal LA_K is connected to an external ground Ext_GND via a drain-source path of an NMOS switch X5. The gate of the NMOS switch X5 obtains the output signal Out. In contrast, the gate of the PMOS switch X6 obtains the inverted output signal −Out from the output of the comparators K1 and K2 via an inverter X2, X4 and a resistor R5. The inverted output signal −Out is applied to ground gnd via a resistor R11. The inverter X2, X4 is supplied with a supply voltage Vdd.

The two output transistors X5 and X6 connect the anode and cathode of the laser diode to the corresponding supply. That is, in the case of error (the output signal is logic "0"), the anode and the cathode of the laser diode are disconnected from the supply.

Figure 4:
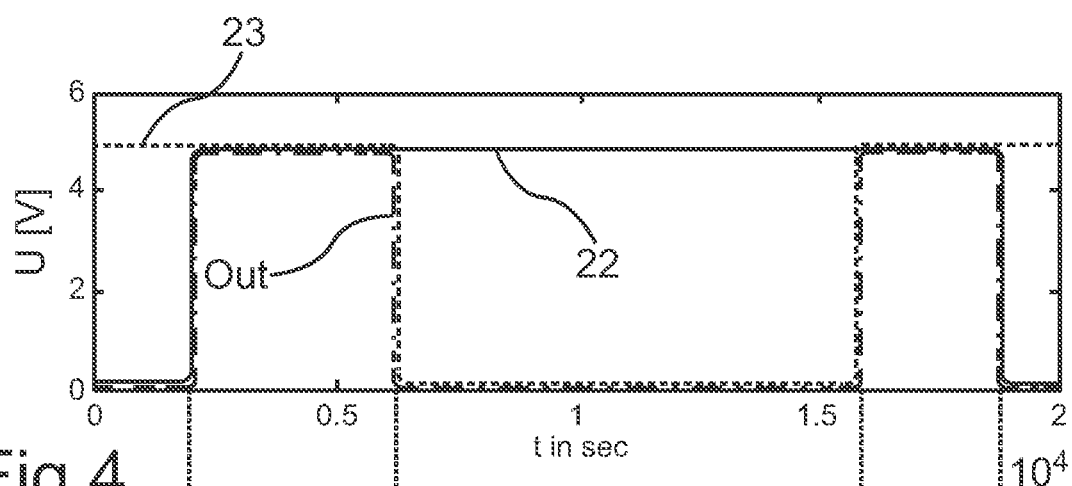
FIG. 4 output voltages of the individual comparators.
Figure 5:
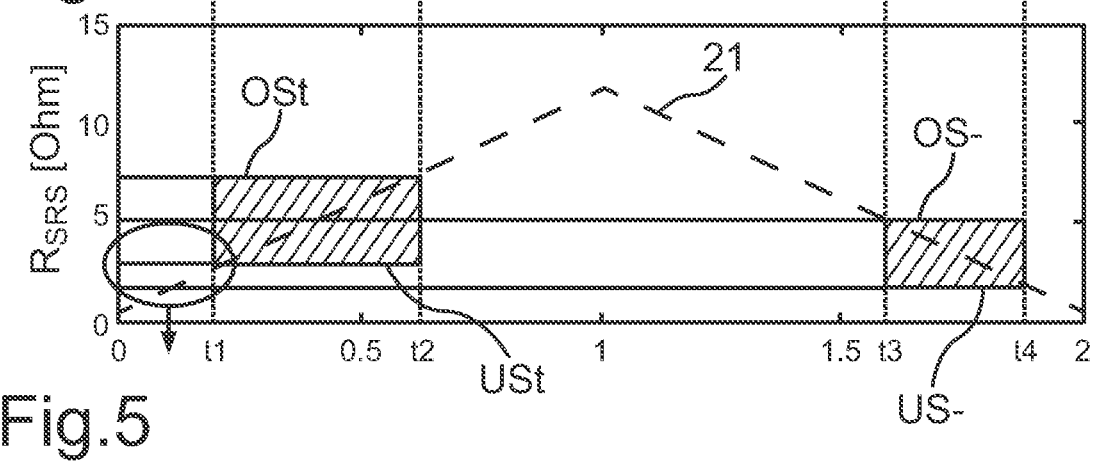
FIG. 5 a representation of the function of the internal feedback.

The functioning of the entire circuit device including measurement bridge and comparator circuit is apparent from FIGS. 4 and 5. The signal $R_{SRS}$ over the time t describes a fictive progress of the resistance of the conductor path loop of the converter. For comprehension of the circuit, it is here assumed that the resistance $R_{SRS}$ of the conductor loop first linearly increases and subsequently again linearly decreases corresponding to the progress 21 in FIG. 5. If the resistance $R_{SRS}$ is very low, thus, an error is present in the converter. The same applies if the resistance $R_{SRS}$ is too high.

In the linear increase, an incorrectly low resistance $R_{SRS}$ is first present. At the point of time t1, the resistance exceeds a high lower threshold value us+. After further increase, the resistance $R_{SRS}$ exceeds the high upper threshold value os+. In the range between the two threshold values us+ and os+, which is hatched in FIG. 5, an error-free state of the converter is present.

After the point of time t2, the resistance $R_{SRS}$ further increases and therefore indicates a defective state of the converter. In the falling range of the resistance progress 21, an error-free state is not to be again immediately indicated at a high upper threshold value os+ (compare hatched area). Therefore, a low upper threshold value os− is used, to securely signal an error-free state. In the further downward progress, a low lower threshold value us− is also used to indicate that the resistance $R_{SRS}$ has again left the error-free space.

FIG. 4 shows the corresponding comparator signals 22 and 23 of the comparators K1 and K2. The progress 22 shows the output signal of the first comparator K1 with respect to the voltage level 1_ref, which can take the values us+ and us−. The level of the first comparator K1 increases at the point of time t1 and only decreases again at the point of time t4.

The level progress 23 in FIG. 4 shows the output of the second comparator K2 in the artificial resistance progress 21 of FIG. 5. First, the output level is on a high level until the point of time t2, decreases at t2 and again rises to a high level at the point of time t3. By the AND-gating, the output signal Out of the circuit device results, which is illustrated in FIG. 4 by a dot-dashed line. The level of the output signal Out is only high between the points of time t1 and t2 as well as between the points of time t3 and t4. These periods of time correspond to the error-free state. For controlling the laser diode by the output signal Out, this means that the laser diode is only operated in the error-free state of the converter.

Below, it is briefly described how the output signal Out is achieved with the bridge circuit and the comparator circuit. If the resistance of the conductor loop approaches the high lower threshold value us+ from low values in the exemplary resistance progress 21 according to FIG. 5, thus, the output signal of the comparator circuit is logic "0". Thereby, the PMOS switch X2 of FIG. 2 is low-ohmic and the NMOS switch X1 is high-ohmic. Thus, the series resistance of the first measurement branch 14 does not correspond to the series resistance R0 of the measurement branch due to the parallel connection of R1 and R6. Rather, the series resistance R1∥R6 is lower-ohmic, which means that the resistance of the conductor path loop (measurement resistance) must be greater than the comparison resistance R3 to compensate for the center voltage (corresponds to 0 V).

If the measurement resistance exceeds the increased threshold value os+ in the further progress (due to the parallel connection of R1 and R6), the comparator combination switches to logic "1", whereby the PMOS transistor X2 of the bridge circuit of FIG. 2 closes and the NMOS transistor X1 completely opens. Thereby, the parallel connection of the resistors R6 and R1 is cancelled and the lower threshold value 1_ref again corresponds to the nominal value us−. That is, if the line resistance decreases in the further progress, it has now to be fallen below this value to label the system as defective.

A nearly identical consideration can be performed for the upper threshold value h ref. In the error-free state, the output signal Out is logic "1", whereby the NMOS transistor X1 is low-ohmic. Thereby, the parallel connection of the resistors R2 and R7 acts as a series resistance in the second comparison branch 15. For this reason, the measurement resistance X0 has to exceed the threshold value by a certain amount to compensate for the center voltage between the measurement branch 13 and the second comparison branch 15. The higher upper threshold value os+ applies. In the further progress, the comparator combination switches to logic "0", whereby the NMOS transistor X1 again becomes high-ohmic and thereby only the resistor R7 is effective as the series resistance. Thus, a correspondingly lower upper threshold value os− is again implemented.

By the described method, a different behavior of the circuit can be produced according to whether the resistance leaves an error-free state or enters an error-free state (compare hatched areas in FIG. 5). Therein, the implemented hysteresis can for example be 2 Ohms at a nominal resistance of 4 Ohms.

Due to the simple practicability of the circuit as well as by the feedback and the used connection of the comparators, it is possible to supply the circuit from the supply of the laser diode. Therein, the required current is typically considerably lower than the required current of the laser diode (e.g. 1/1000). Further, a PWM operation of the laser is also possible free of disturbance by an inexpensively implementable buffering.

By this implementation, an own shutoff of the module in the case of error is possible without this having to be reported to the controller and without an additional connection at the plug becoming required. This reduces the cost and the complexity of the overall system.

The invention claimed is:

1. A circuit device for monitoring an optical converter comprising:
   a measurement bridge with a measurement branch, a first comparison branch and a second comparison branch, wherein
   a conductor path loop of the converter is integrated in the measurement branch,
   the first comparison branch has a first series resistance variable via a first active element,
   the second comparison branch has a second series resistance variable via a second active element,
   the first and the second active element are each controllable by a same control signal,
   the circuit device has an evaluation circuit with a first comparator and a second comparator, the outputs of which form the control signal and at the same time an output signal of the circuit device in AND-gated manner, wherein
      the first comparator compares a tap of the first comparison branch to a tap of the measurement branch and
      the second comparator compares a tap of the second comparison branch to a tap of the measurement branch.

2. The circuit device according to claim 1, wherein the first active element is a metal oxide semiconductor.

3. The circuit device according to claim 1, wherein the second active element is a metal oxide semiconductor.

4. The circuit device according to claim 1, wherein the first comparison branch has a different reference resistance for a lower threshold value than the second comparison branch for an upper threshold value.

5. The circuit device according to claim 2, wherein the first active element is a PMOS switch.

6. The circuit device according to claim 2, wherein the second active element is a metal oxide semiconductor.

7. The circuit device according to claim 6, wherein the second active element is an NMOS switch.

8. The circuit device according to claim 7, wherein the first active element is a PMOS switch.

9. The circuit device according to claim 3, wherein the second active element is an NMOS switch.

10. The circuit device according to claim 2, wherein the first comparison branch has a different reference resistance for a lower threshold value than the second comparison branch for an upper threshold value.

11. The circuit device according to claim 3, wherein the first comparison branch has a different reference resistance for a lower threshold value than the second comparison branch for an upper threshold value.

12. A converter assembly comprising:
   an optical converter, on which a conductor path loop for monitoring is disposed; and
   a circuit device comprising:
      a measurement bridge with a measurement branch, a first comparison branch and a second comparison branch, wherein
      a conductor path loop of the converter is integrated in the measurement branch,
      the first comparison branch has a first series resistance variable via a first active element,
      the second comparison branch has a second series resistance variable via a second active element,
      the first and the second active element are each controllable by a same control signal,
      the circuit device has an evaluation circuit with a first comparator and a second comparator, the outputs of which form the control signal and at the same time an output signal of the circuit device in AND-gated manner, wherein
         the first comparator compares a tap of the first comparison branch to a tap of the measurement branch and the second comparator compares a tap of the second comparison branch to a tap of the measurement branch;

wherein the circuit device is connected to the conductor path loop.

13. The converter assembly according to claim 12, wherein the conductor path loop is formed on a surface of the converter and has the shape of a meander, and at least one partial loop of the meander completely surrounds a circular conversion area of the converter.

14. A lighting device comprising:
a laser diode; and
a converter assembly comprising:
an optical converter, on which a conductor path loop for monitoring is disposed; and
a circuit device comprising:
a measurement bridge with a measurement branch, a first comparison branch and a second comparison branch, wherein
a conductor path loop of the converter is integrated in the measurement branch,
the first comparison branch has a first series resistance variable via a first active element,
the second comparison branch has a second series resistance variable via a second active element,
the first and the second active element are each controllable by a same control signal,
the circuit device has an evaluation circuit with a first comparator and a second comparator, the outputs of which form the control signal and at the same time an output signal of the circuit device in AND-gated manner, wherein
the first comparator compares a tap of the first comparison branch to a tap of the measurement branch and
the second comparator compares a tap of the second comparison branch to a tap of the measurement branch;
wherein the circuit device is connected to the conductor path loop;
wherein the laser diode is controlled by the output signal of the circuit device.

15. The lighting device according to claim 14, wherein there are separately connected to supply terminals an anode of the laser diode via a first semiconductor switching element controllable by the output signal and a cathode of the laser diode via a second semiconductor switching element controllable by the output signal.

16. The lighting device according to claim 15, wherein the first semiconductor switching element is controlled by the output signal of the circuit device via an inverter.

17. The lighting device according to claim 15, wherein a supply of the lighting device is ensured via the supply terminals of the laser diode.

18. The lighting device according to claim 16, wherein a supply of the lighting device is ensured via the supply terminals of the laser diode.

* * * * *